(12) United States Patent
Mao et al.

(10) Patent No.: US 8,880,880 B2
(45) Date of Patent: Nov. 4, 2014

(54) FACILITATING ACCESS CONTROL IN PEER-TO-PEER OVERLAY NETWORKS

(75) Inventors: Yinian Mao, San Diego, CA (US); David W. Craig, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 331 days.

(21) Appl. No.: 13/194,812

(22) Filed: Jul. 29, 2011

(65) Prior Publication Data

US 2013/0031367 A1    Jan. 31, 2013

(51) Int. Cl.
  *H04L 29/06* (2006.01)
  *H04L 29/08* (2006.01)

(52) U.S. Cl.
  CPC .......... *H04L 67/104* (2013.01); *H04L 63/0407* (2013.01); *H04L 63/10* (2013.01)
  USPC .............................................. 713/168; 726/4

(58) Field of Classification Search
  CPC .... H04L 63/0407; H04L 63/10; H04L 67/104
  USPC .............................................. 713/168; 726/4
  See application file for complete search history.

(56) References Cited

U.S. PATENT DOCUMENTS

| | | | |
|---|---|---|---|
| 7,263,560 | B2 | 8/2007 | Abdelaziz et al. |
| 7,603,464 | B2 | 10/2009 | White |
| 7,965,843 | B1 * | 6/2011 | Maino et al. ................. 380/256 |
| 2004/0064693 | A1 * | 4/2004 | Pabla et al. .................... 713/168 |
| 2005/0108368 | A1 | 5/2005 | Mohan et al. |
| 2006/0053296 | A1 * | 3/2006 | Busboom et al. ............. 713/182 |
| 2006/0133613 | A1 * | 6/2006 | Ando et al. .................... 380/270 |
| 2006/0171388 | A1 * | 8/2006 | Ikeda ............................. 370/389 |
| 2007/0011453 | A1 * | 1/2007 | Tarkkala et al. .............. 713/168 |
| 2007/0198831 | A1 * | 8/2007 | Suzuki et al. ................. 713/156 |
| 2007/0202876 | A1 | 8/2007 | Bemmel |
| 2009/0016255 | A1 * | 1/2009 | Park ............................... 370/312 |
| 2009/0016353 | A1 * | 1/2009 | Li et al. ...................... 370/395.3 |
| 2009/0030786 | A1 * | 1/2009 | Rosler et al. .................... 705/14 |
| 2009/0106547 | A1 | 4/2009 | Yokota et al. |
| 2010/0094877 | A1 * | 4/2010 | Garbe ............................ 707/742 |
| 2010/0115031 | A1 * | 5/2010 | Lin et al. ....................... 709/204 |
| 2010/0318795 | A1 * | 12/2010 | Haddad et al. ................ 713/168 |
| 2012/0151206 | A1 * | 6/2012 | Paris et al. ..................... 713/155 |
| 2013/0007442 | A1 * | 1/2013 | Mao et al. ...................... 713/156 |

OTHER PUBLICATIONS

Ryu, Sunam et al., "Leveraging Identity-based Cryptography for Node ID Assignment in Structured P2P Systems", 2007, pp. 1-10.*

(Continued)

*Primary Examiner* — Michael Pyzocha
(74) *Attorney, Agent, or Firm* — Won Tae Kim

(57) ABSTRACT

Methods and apparatuses are provided for facilitating access controls for digital objects stored within a peer-to-peer overlay network. A privacy-preserving method is provided for matching identities between a first peer node and a second peer node in a peer-to-peer network. Such identity matching may be used, for example, to ascertain whether the first peer node should provide access to certain digital object stored in the peer-to-peer overlay network. Rather than providing its identities in an unprotected format, the second peer may provide its identities to the first peer node in a concealed representation so as to prevent the first peer from learning about non-matching identities. Such concealed representation may be a data structure that cryptographically conceals one or more identities of the second peer node or a user of the second peer node within a shared data space of the data structure.

47 Claims, 11 Drawing Sheets

(56) References Cited

OTHER PUBLICATIONS

Jyothi et al., "SyMon: Defending Large Structured P2P Systems Against Sybil Attack", IEEE P2P'09—Sep. 9-11, 2009, pp. 21-30.*
Stoica, Ion et al., "Chord: A Scalable Peer-to-peer Lookup Service for Internet Applications", SIGCOMM'01, Aug. 27-31, 2001, pp. 149-160.*
Lu et al. "Trust-Based Privacy Preservation for Peer-to-peer Data Sharing". IEEE Transactions on Systems, Man and Cybernetics [Online] 2006, vol. 36, Issue 3.
International Search Report and Written Opinion—PCT/US2012/048899—ISA/EPO—Nov. 15, 2012.

* cited by examiner

Bloom Filter Vector (BFV) = [0, 0, 0, 0, 0, 0, 0, 0, 0, 0, 0, 0, 0, 0, 0, 0, 0, 0, 0, ..., 0]

←——————Filter length = m bits long——————→

Hash Functions : H1, H2, H3 ....Hk

Identities Set for Peer A: $S_A$ = yahoo-A, gmail-A, facebook-A, amazon-A, ebay-A, company-A, school-A, etc.

Calculate Hashes for Identities: (3 bit output per hash)

H1(yahoo-A)    = "010" = 2 -> set position 2 -> $f_{A1}$ = [0, 0, 1, 0, 0, 0, 0, 0, 0, 0, ..., 0]
H2(gmail-A)    = "101" = 5 -> set position 5 -> $f_{A2}$ = [0, 0, 0, 0, 0, 1, 0, 0, 0, 0, ..., 0]
H3(facebook-A) = "001" = 1 -> set position 1 -> $f_{A3}$ = [0, 1, 0, 0, 0, 0, 0, 0, 0, 0, ..., 0]
H4(amazon-A)   = "010" = 2 -> set position 2 -> $f_{A4}$ = [0, 0, 1, 0, 0, 0, 0, 0, 0, 0, ..., 0]
H5(company-A)  = "111" = 7 -> set position 7 -> $f_{A5}$ = [0, 0, 0, 0, 0, 0, 0, 1, 0, ..., 0]
H6(school-A)   = "100" = 4 -> set position 4 -> $f_{A6}$ = [0, 0, 0, 0, 1, 0, 0, 0, 0, 0, ..., 0]

Resulting BFV-A = [$f_{A1}, f_{A2}, f_{A3}, f_{A4}, f_{A5}, f_{A6}$] = [0, 1, 1, 0, 1, 1, 0, 1, 0, ..., 0]

FIG. 3

Bloom Filter Vector (BFV) = [0, 0, 0, 0, 0, 0, 0, 0, 0, 0, 0, 0, 0, 0, 0, 0, 0, 0, 0, ..., 0]

←——— Filter length = m bits long ———→

Hash Functions : H1, H2, H3 ....Hk

Identities Set for Peer A: $S_A$ = yahoo-A, gmail-A, facebook-A, amazon-A, ebay-A, company-A, school-A, etc.

Calculate Hashes for Identities: (12 bit output per hash)

Hash (yahoo-A) {
H1(yahoo-A) = "000000000010" = 2 -> set position 2 -> $f_{A1-1}$ = [0, 0, 1, 0, 0, 0, 0, 0, ..., 0]
H2(yahoo-A) = "000000000101" = 5 -> set position 5 -> $f_{A1-2}$ = [0, 0, 0, 0, 0, 1, 0, 0, 0, ..., 0]
H3(yahoo-A) = "010101010110" = 1362 -> set position 1362 -> $f_{A1-3}$ = [0, 0, 0, 0, 0, 0, ..., 1, 0, 0, ..., 0]
H4(yahoo-A) = "111010110010" = 3762 -> set position 3762 -> $f_{A1-4}$ = [0, 0, 0, 0, 0, 0, ..., 0, ..., 1, 0, ..., 0]
H5(yahoo-A) = "000000000111" = 7 -> set position 8 -> $f_{A1-5}$ = [0, 0, 0, 0, 0, 0, 0, 0, 1, 0, ..., 0]
...
Hk(yahoo-A) = "000110101001" = 467 -> set position 467 -> $f_{A1-k}$ = [0, 0, 0, 0, ..., 0, 1, 0, 0, ..., 0]
}

Hash (gmail-A)
Hash (facebook-A)
Hash (amazon-A)
Hash (ebay-A)
Hash (company-A)

Hash (school-A) {
H1(school-A) = "011111001101" = 1997 -> set position 1997 -> $f_{Az-1}$ = [0, 0, 0, 0, 0, ..., 1, 0, 0, ..., 0]
H2(school-A) = "000000110111" = 55 -> set position 55 -> $f_{Az-2}$ = [0, 0, ..., 1, 0, 0, 0, 0, 0, ..., 0]
H3(school-A) = "000010100110" = 166 -> set position 16 -> $f_{Az-3}$ = [0, 0, 0, ..., 0, 0, 1, 0, 0, ..., 0]
H4(school-A) = "000000010100" = 20 -> set position 20 -> $f_{Az-4}$ = [0, ..., 1, 0, 0, 0, 0, 0, 0, ..., 0]
H5(school-A) = "110101111100" = 3452 -> set position 3452 -> $f_{Az-5}$ = [0, 0, 0, 0, 0, 0, 0, ..., 1, ..., 0]
...
Hk(school-A) = "011110111110" = 2014 -> set position 2014 -> $f_{Az-k}$ = [0, 0, 0, 0, 0, ..., 0, 1, 0, ..., 0]
}

Resulting BFV-A = [$f_{A1-(1-k)}$, $f_{A2-(1-k)}$, $f_{A3-(1-k)}$, ..., $f_{Az-(1-k)}$] = [0, 1, 1, 0, 1, 1, 0, 1, 0, ..., 0]

FIG. 4

$S_A: \{f_{A1}, f_{A2}, f_{A3}, f_{A4}, f_{A5}, \ldots, f_{An}\}$ and $S_x: \{f_{x1}, f_{x2}, \ldots, f_{xg}\}$ BFV-A = $[f_{A1}, f_{A2}, f_{A3}, f_{A4}, f_{A5}, \ldots, f_{An}] = [0, 1, 0, \ldots, 1, 1, 0, 0, 0, 1, \ldots, 1, 0, 0, 1, 1, 0, 0, 0, \ldots, 0]$ BFV-Object-x1 = $f_{x1}$ = $[1, 0, 0, \ldots, 0, 0, 0, 0, 0, \ldots, 0, 1, 0, 0, 0, 0, 0, \ldots, 1]$ BFV-Object-x2 = $f_{x2}$ = $[0, 0, 1, \ldots, 0, 0, 0, 0, 0, 1, \ldots, 0, 0, 0, 0, 0, 0, 0, \ldots, 0]$ BFV-Object-xf = $f_{xg}$ = $[0, 1, 0, \ldots, 0, 0, 0, 0, 0, 0, \ldots, 0, 0, 1, 0, 0, 0, 0, \ldots, 0]$ No Identity Match: $[f_{A1}, f_{A2}, f_{A3}, f_{A4}, f_{A5}, \ldots, f_{An}]$ doe not intersect $[f_{x1}, f_{x2}, \ldots, f_{xg}]$

FIG. 6

$S_A: \{f_{A1}, f_{A2}, f_{A3}, f_{A4}, f_{A5}, \ldots, f_{An}\}$ and $S_x: \{f_{x1}, f_{x2}, \ldots, f_{xg}\}$ BFV-A = $[f_{A1}, f_{A2}, f_{A3}, f_{A4}, f_{A5}, \ldots, f_{An}] = [0, 1, 0, \ldots, 1, 1, 0, 0, 0, 1, \ldots, 1, 0, 0, 1, 1, 0, 0, 0, \ldots, 0]$ BFV-Object-x1 = $f_{x1}$ = $[1, 0, 0, \ldots, 0, 0, 0, 0, 0, \ldots, 0, 1, 0, 0, 0, 0, 0, \ldots, 1]$ BFV-Object-x2 = $f_{x2}$ = $[0, 1, 0, \ldots, 0, 0, 0, 0, 0, 1, \ldots, 0, 0, 0, 0, 1, 0, 0, \ldots, 0]$ BFV-Object-xf = $f_{xg}$ = $[0, 0, 0, \ldots, 0, 0, 0, 0, 0, 0, \ldots, 1, 0, 0, 0, 0, 0, 0, \ldots, 0]$ Identity Match: $[f_{A1}, f_{A2}, f_{A3}, f_{A4}, f_{A5}, \ldots, f_{An}]$ intersects $[f_{x1}, f_{x2}, \ldots, f_{xg}]$, e.g. $f_{A3} = f_{x2}$

FIG. 7

FACILITATING ACCESS CONTROL IN PEER-TO-PEER OVERLAY NETWORKS

BACKGROUND

1. Field

Various features disclosed herein pertain generally to peer-to-peer overlay networks, and at least some features pertain to facilitating access controls in peer-to-peer overlay networks while maintaining user privacy.

2. Background

Peer-to-peer (P2P) overlay networks are designed for low-cost scalability and easy deployment of applications. In a P2P network, each user is connected to the rest of the network via a set of peers. Furthermore, each user may have a set of identities (e.g., membership information, email addresses, group memberships, account identifiers, and/or other form of membership/account identifiers) that form a discrete set. This set of identities can be considered a discrete set in the mathematical sense, which refers to a collection of elements of the same nature. A problem arises when two peers, A and B, want to find out the intersection of their identity sets. For example, Peer A may include the identities ("Yahoo-A", "gmail-A", "fb-A", "ebay-A", etc.) and Peer B may include the identities ("gmail-B", "LinkedIn-B", "bank-B", etc.). Identity matching may happen when A and B are trying to find out whether they belong to the same group (thus having the same group credential); or when one party is performing access control on an object, which requires an identity from a set of allowed identities, and the other party is trying to access the object. For example, only peers having an eBay™ account ("ebay-n") can be granted access to a particular object.

In a peer-to-peer network, the two identity sets must be transported to the same peer to perform the operation (e.g. Peer A sends his identity set to Peer B). An insecure solution is for one peer to send the entire set stored on its machine to the other peer of the P2P network (e.g., Peer A sends all its identities—"Yahoo-A", "gmail-A", "fb-A", "ebay-A", etc.—to Peer B). The receiving peer can then perform set operations, and sends back the result of the operations. That is, the set operations may determine whether a peer includes an identity that gives it access to a particular digital object (e.g., data, keys, passwords, executable, application, etc.). When the set involved in the operations are large, such a solution incurs significant overhead in terms of messaging and computation. Furthermore, such an operation may reveal all of Peer A's identities or memberships to Peer B and potentially all nodes in the routing path, which could violate Peer A's privacy. For instance, if a peer were to send an identity set with its identities, this may allow receiving peers and/or intermediary peers to ascertain some or all of the identities or related information, thereby potentially revealing private information (e.g. Peer A may send an identity set that may reveal a membership in a medical group of rare disease which indicate that Peer A has the disease).

Therefore a way is needed to preserve the privacy (e.g., identities, memberships, etc.) of a peer while still being able to perform access control in a peer-to-peer network.

SUMMARY

A method operational in a requesting peer node is provided for obtaining access to a digital object while protecting the privacy of the requester. A data structure is generated that cryptographically conceals one or more identities of the requesting peer node or a user of the requesting peer node within a shared data space of the data structure. A representation of each of the one or more identities may be uniformly and randomly distributed along the shared data space. The data structure may then be sent to a validating peer node as part of a request to access a digital object. In response, the requesting peer node may receive information from the validating peer node indicating whether any of the one or more identities is a match to access the requested digital object.

From the received information, the requesting peer node may identify a first identity as a match and selects authentication data corresponding to the first identity. The selected authentication data is then sent to the validating peer node to authenticate access to the digital object. If the selected authentication data is successfully authenticated by the validating peer node, the requesting peer node may obtain access to the digital object.

The one or more identities may be group identities and the digital object is data available to only members of a particular group. The requesting peer node and the validating peer node may communicate wirelessly over an overlay peer-to-peer network. The data structure may be a binary vector in which each of the one or more identities are represented by a plurality of bits that are uniformly and randomly distributed along the binary vector.

In one example, the binary vector may be generated by: (a) applying a cryptographic hash function to a first identity to generate a binary string; (b) partitioning the binary string into binary segments; (c) converting each binary segment into a position index within the binary vector; an/or (d) setting a vector value at the indicated position index of the binary vector to a non-default value. A plurality of additional identities may be converted to position indexes that are set in the binary vector to the non-default value. The data structure may be a Bloom filter vector in which each identity is represented by a plurality of bits uniformly and randomly distributed along the Bloom filter vector. In this sense, the data structure is a probabilistic data structure where false positive identity matches are possible.

A method operational in a validating peer node is provided for facilitating access to a digital object while protecting the privacy of the requester. A data structure may be received from a requesting peer node as part of a request to access a digital object, where the received data structure cryptographically conceals one or more identities of the requesting peer node or a user of the requesting peer node within a shared data space of the data structure. A representation of each of the one or more identities may be uniformly and randomly distributed along the shared data space. One or more access identities are obtained that are allowed to access the digital object. A second data structure is generated for each of the access identities, where the second data structure cryptographically conceals an access identity of the digital object. A comparison is then performed between the received data structure and the second data structure to ascertain whether there is an intersection of identities indicating a potential match. The information is then sent to the requesting peer node indicating whether any of the one or more identities of the requesting peer node is a match to access the requested digital object.

In response, the validating peer node may receive authentication data associated with a matching identity identified by the validating peer device. The validating peer node may then grant the requesting peer node access to the requested digital object if the received authentication data is successfully authenticated. The authentication data is authenticated to verify that the requesting peer node is a member of a group identified by the matching identity. The information sent by the validating peer node to indicate a match may be a matching identity. The information sent by the validating peer node to indicate a match may be a concealed version of the matching identity. In various implementations, the requested digital object may be stored by the validating peer node or by a storing peer node.

In one example, the received data structure may be a binary vector in which each of the one or more identities of the requesting peer node are represented by a plurality of bits that are uniformly and randomly distributed along the binary vector. For instance, the data structure may be a Bloom filter vector in which each identity is represented by a plurality of bits uniformly and randomly distributed along the binary vector.

The second data structure is a binary vector is generated by: (a) applying a cryptographic hash function to a first identity to generate a binary string; (b) partitioning the binary string into binary segments; (c) converting each binary segment into a position index within the binary vector; and/or (d) setting a vector value at the indicated position index of the binary vector to a non-default value.

BRIEF DESCRIPTION OF THE DRAWINGS

FIG. 3 illustrates one example of generating a Bloom filter vector that conceals a plurality of identities for a requesting peer node.

FIG. 4 illustrates an example of generating a Bloom filter vector that conceals a plurality of identities for a requesting peer node while reducing the probability of false positives.

FIG. 6 illustrates an example of one or more Bloom filter vectors that may be generated for access identity that is permitted to access a digital object.

FIG. 7 illustrates an example of one or more Bloom filter vectors that may be generated for one or more identities that are permitted access to a digital object.

DETAILED DESCRIPTION

Figure 1:
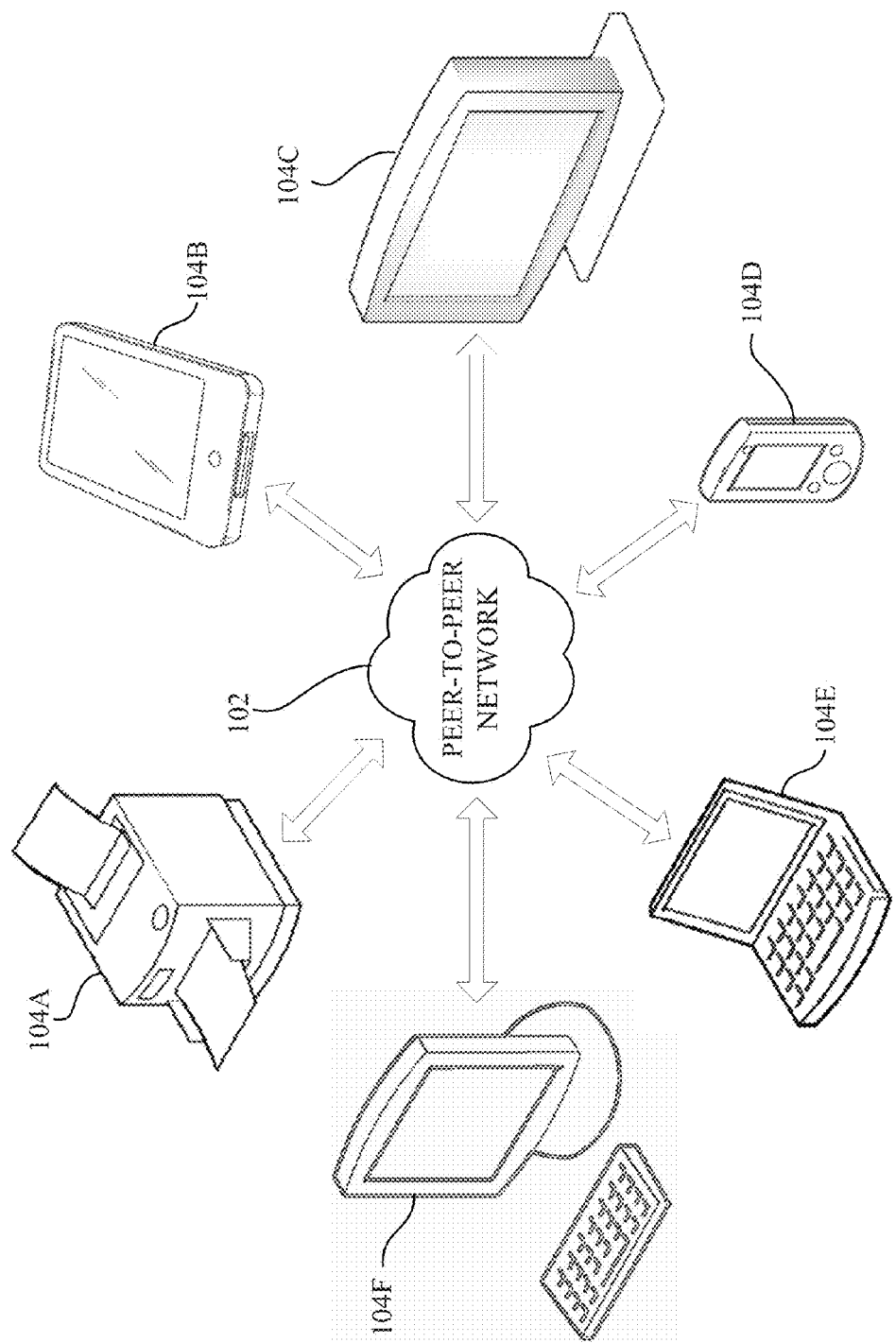
FIG. 1 is a block diagram illustrating a network comprising a peer-to-peer overlay network and a plurality of peer nodes.

In the following description, specific details are given to provide a thorough understanding of the described implementations. However, it will be understood by one of ordinary skill in the art that various implementations may be practiced without these specific details. For example, circuits may be shown in block diagrams in order not to obscure the implementations in unnecessary detail. In other instances, well-known circuits, structures and techniques may be shown in detail in order not to obscure the described implementations.

The word "exemplary" is used herein to mean "serving as an example, instance, or illustration." Any implementation or embodiment described herein as "exemplary" is not necessarily to be construed as preferred or advantageous over other embodiments or implementations. Likewise, the term "embodiments" does not require that all embodiments include the discussed feature, advantage or mode of operation. The terms "peer-to-peer overlay network" and "peer node" as used herein are meant to be interpreted broadly. For example, a "peer-to-peer overlay network" may refer to an overlay network that is not centrally coordinated by servers or stable hosts and that includes a distributed application architecture that partitions tasks or workloads between peers. Furthermore, a "peer node" may refer to a device that facilitates communication on a peer-to-peer overlay network. Examples of "peer nodes" may include printers, tablet computers, televisions, mobile phones, personal digital assistants, personal media players, laptop computers, notebook computers, desktop computers, etc.

Overview

One feature facilitates access controls for digital objects stored within a peer-to-peer overlay network. A privacy-preserving method is provided for matching identities between a first peer and a second peer in a peer-to-peer network, and can be extended to multiple additional peers. Such identity matching may be used, for example, to ascertain whether the first peer should provide access (e.g., read access, write access, delete access, execute access, etc.) to certain digital object (e.g., data, application, executable, keys, etc.) to the second peer. For instance, the second peer may provide the first peer a list of its identities so that identity matching can be performed. However, rather than providing its identities in an unprotected format, the second peer may provide its identities in a concealed representation so as to prevent the first peer from learning about the non-matching identities. That is, by concealing the identities, only a matching identity of the second peer is revealed to the first peer while other identities of the second peer are kept private.

In one example, the identities provided by the first peer to the second peer may be group identities. For instance, such group identities may identify various types of groups, such as clubs, schools, associations, companies, etc., of which a user of the first peer may be a member of or has an account/subscription to. That is, the first peer may provide one or more group identities (in a concealed format) which the second peer may use to ascertain whether access (e.g., to a data object, executable code, keys, etc.) may be granted to the first peer. That is, if a particular group identity of the first peer matches a group identity that is allowed access to the digital object, then the second peer may grant such access. In some implementations, in order to verify the first peer's assertion of being a member of a particular group, a subsequent authentication process may be performed to authenticate the first peer's membership of the particular group. For example, this may be done by the first peer presenting some credential (e.g., a user identity) signed by a group administrator of the particular group (e.g., signed by a private key belonging to the particular group and verifiable by a corresponding public key).

According to one aspect, concealment of identities may be achieved by hashing one or more identities and representing the hash values within a binary vector. For example, such binary vector may be implemented as a Bloom filter, a data structure consisting of a binary vector of length of length m, and number of hash functions k. Before the operations, the sender peer and receiver peer agree on a series of hash functions, denoted by $f_{hash1}$, $f_{hash2}$, ..., where the number of hash functions can be arbitrarily large. One or more of these hash functions may then be used to generate one or more offset or position index values into a composite binary vector that may represent a plurality of identities for the first peer. This composite binary vector may be sent by the first peer to the second peer. The second peer may then generate, in similar fashion, a local binary vector for each of the identities it wishes to compare (e.g., the identities that are allowed access to the digital object requested). The local binary vector may then be compared to the composite binary vector to determine if a match is found.

Exemplary Operating Network

FIG. 1 is a block diagram illustrating a network comprising a peer-to-peer overlay network 102 and a plurality of peer nodes 104A-104F. The peer-to-peer overlay network 102 may be decentralized and/or distributed such that it is not centrally coordinated by servers or stable hosts. Digital objects may be stored among the peer nodes 104A-104F of the network. The term "digital object" is herein used to refer to various types of information, including data objects, executable code, programs, keys, certificates, etc. The peer-to-peer overlay network 102 may be implemented over an existing network structure (e.g., a wireless network). For example, the peer-to-peer overlay network 102 can be implemented to operate at the highest layer of a communication protocol stack (e.g., the application layer). Such a peer-to-peer overlay network 102 may utilize any type of underlying network, such as an Internet Protocol network, to allow a plurality of peer nodes 104A-104F on the overlay network 102 to communicate with each other. The underlying network may comprise any number of types of networks, such as Wide Area Networks (WAN), Local Area Networks (LAN), wireless networks (e.g., WWAN, WLAN) and/or any other type of network.

Peer nodes 104A-104F can include devices adapted to communicate via the peer-to-peer overlay network 102. Such devices may include a middleware layer adapted to facilitate communications via the peer-to-peer overlay network 102. By way of example and not limitation, peer nodes can include devices such as printers 104A, tablet computers 104B, televisions 104C, mobile phones, personal digital assistants, and personal media players 104D, laptop and notebook computers 104E, and/or desktop computers 104F.

Employing the peer-to-peer overlay network 102, each of the peer nodes 104A-104F is able to communicate with other peer nodes 104A-104F without the need for central coordination by servers or stable hosts. For example, each of the peer nodes 104A-104F can make a portion of their resources (e.g., processing power, disk storage, network bandwidth) available to another peer node, and can utilize a portion of another peer node's resources without a server or stable host for central coordination. One or more of the peer nodes 104A-104F may store digital objects that may be accessed by other peer nodes within the peer-to-peer overlay network 102. The term "access" may refer to various types of access, including, read, write, delete, modify, execute, and store access. Each such digital object may have an associated identifier that may be used locate the digital object within the peer-to-peer network 102. In one example, access to a digital object within the peer-to-peer network may be restricted to users or peer nodes that can show rights to access such digital object. For instance, such access rights may be restricted to members of one or more groups. Access rights may be verified by, for example, proving membership within a group (e.g., having an account associated with a particular group, where the account may be signed by a private key for that group and verifiable using a corresponding public key).

A requesting peer node wishing to gain access to a digital object may request such access (or the digital object itself) from another peer node (e.g., a storing peer node or a validating peer node). An efficient way to seek such access is for the requesting peer node to provide all of its identities (e.g., account or membership information) at once, rather than checking each one individually. Providing such identities from the requesting peer node to the storing/validating peer node may permit the storing/validating peer node to ascertain whether the requesting peer node belongs to a group that has access to the requested digital object. However, to prevent undesired or unwanted disclosure of peer node identities, the peer-to-peer overlay network may provide a middleware format that defines an access request. For example, the access request may be constructed to include all or a plurality of identities of the requesting peer node in a concealed format.

Figure 2:
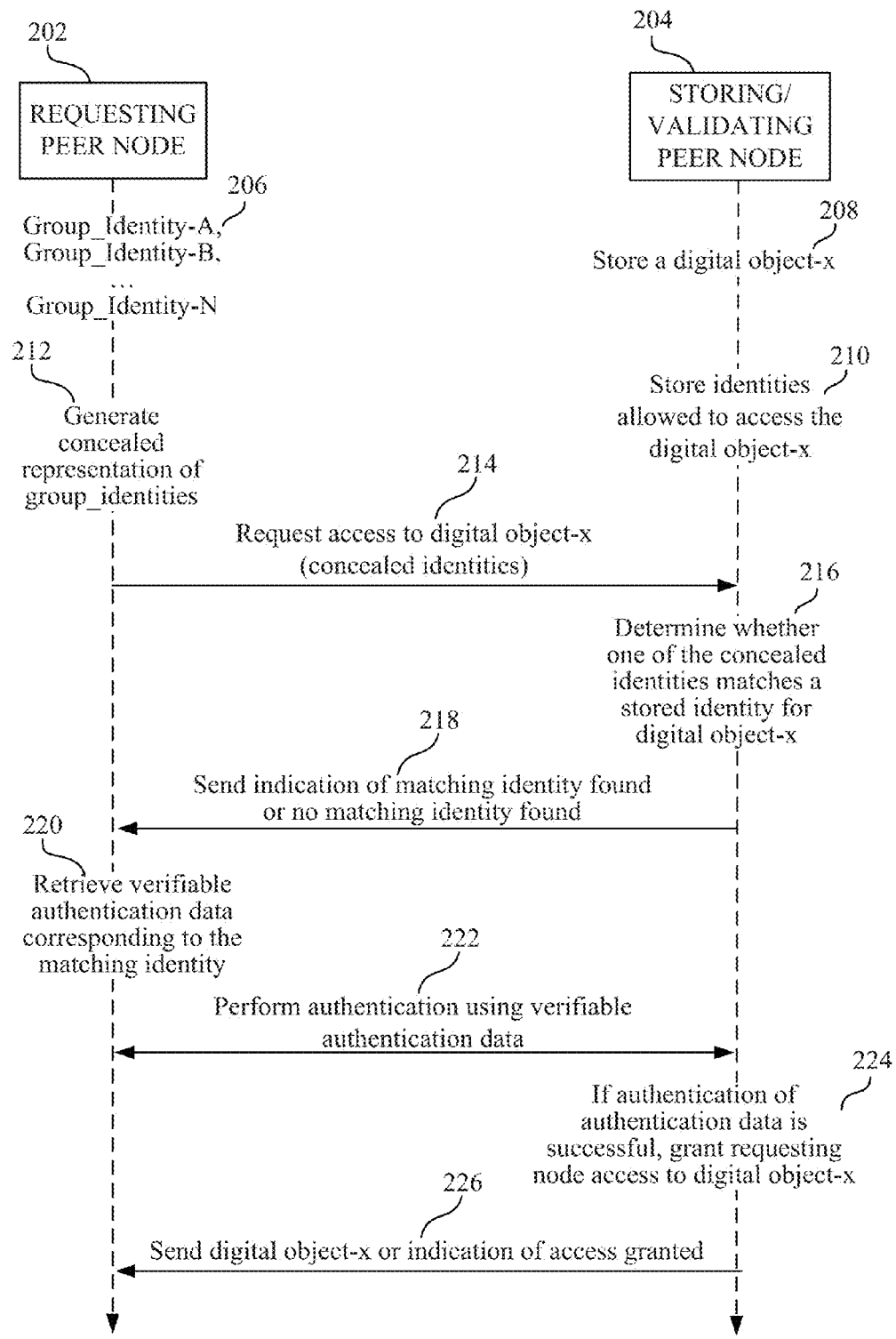
FIG. 2 is a flow diagram illustrating an exchange between a requesting peer node and a storing and/or validating peer node to process an access request while guarding the privacy of the requesting peer node's identities.

FIG. 2 is a flow diagram illustrating an exchange between a requesting peer node and a storing and/or validating peer node to process an access request while guarding the privacy of the requesting peer node's identities. A requesting peer node 202 may include a plurality of identities 206 (e.g., Group_Identity-A, Group_Identity-B, . . . Group_Identity-N). Such identities may have been previously obtained and/or established. Each identity may be associated, for example, with a group (e.g., school, company, support group, club, association, etc.) of which a user of the requesting peer node is a member. Additionally, for each group identity, the requesting peer node (or user) may have authentication data (e.g., a user identity, certificate and/or a digital signatures) that may serve to identify and/or authenticate the user of the requesting peer node as a member of a group (e.g., member of an investment club, member of a company, member of a university, etc.).

A storing and/or validating peer node 204 may store a digital object-x 208 and/or identities that are allowed to access the digital object-x 210. In some implementations, a storing peer node may store the digital object-x as well as validates access to the digital object-x. In other implementations, a validating peer node may simply ascertain whether a requesting peer node should be granted access to the digital object-x that is stored in another peer node (i.e., a storing peer node).

In order to obtain or gain access to the digital object-x, the requesting peer node 202 may generate a concealed representation of its identities 212 (e.g., group identities). It then sends an access request to the digital object-x 214 that may include the concealed identities. Upon receipt of the access request 214, the storing/validating peer node 204 may determine whether one of the concealed identities matches an identity allowed to access the digital object-x. In one implementation, the identities may be group names (e.g., companies, associations, schools, etc.) to which the requesting peer node or user of the requesting peer node belongs.

The concealed identities may be compared (e.g., using set operations) to the stored identities 210 (e.g., identities allowed to access the digital object-x) to determine whether a match exists. The storing/validating peer node 204 may then send an indication of a matching identity or no matching identity 218. If a matching identity is found, then the indication 218 may provide sufficient data to allow the requesting peer node 202 to identify the matching identity. Upon receipt of such information, the requesting peer node 202 may use the identified/matching identity to perform an authentication exchange 222 with the storing/validating peer node 204. For example, the matching identity may be used by the requesting peer node 202 to select a corresponding authentication data (e.g., certificate, signature and/or user identity) associated with the matching identity. The corresponding authentication data may be used by the requesting peer node to authenticate itself to the storing/validating peer node 204 (e.g., by sending the corresponding certificate or user identity or by some challenge/response exchange). If such authentication is successful 224, access to the digital object-x may be granted to the requesting peer node 202. For instance, the storing/validating peer node 204 may send the digital object-x or an indication of access granted to the requesting peer node 202. Note that, various authentication protocols may be used, including a challenge-response protocol where the validating peer node 204 sends a random challenge to the requesting peer node 202 and receives a signed version of the random challenge that can be verified by the validating peer node (e.g., the random challenge is signed by the requesting peer node using its private key and which can be verified by the validating peer nod using a corresponding public key).

According to one example, the group identities 206 may be names of groups (e.g., "engineering_society_of_america", "science_fiction_afficionados", "qualcomm_employees", "ucla_student_association", etc.) of which the requesting peer node 202 (or a user of the requesting peer node) claims to be a member. These group identities may be concealed by hashing and/or combining them into a binary vector that is transmitted to the storing/validating peer node 204. The storing/validating peer node 204 may then ascertain whether any of the group identities is allowed access to the requested digital object-x. Due to the concealment of the group identities (e.g., by hashing and mapping into a binary vector), the actual group identities are not revealed to the storing/validating peer node, except for a matching group identity. If a matching group identity is found (e.g., "qualcomm_employees"), then this match is conveyed to the requesting peer node 202. In a subsequent step, the requesting peer node 202 may be asked to prove actual membership in the group identified by the matching group identity. Such proof may be had by, for example, the requesting peer node 202 providing a certificate or user identity signed by a group administrator of the matching group identity. In one example, such certificate or user identity may be signed by a private key associated with the group (e.g., $Cert_{prv\text{-}Key}$(user identity)). A corresponding public key may be used to authenticate the signed certificate or user identity. If the provided certificate or user identity is successfully authenticated, then access to the digital object-x may be granted to the requesting peer 202.

Exemplary Implementation of Identity Concealment Using a Binary Vector

In one implementation, a requesting peer node's identities (e.g., group identities) may be concealed using a binary vector data structure such as a Bloom filter vector. A Bloom filter is a space-efficient probabilistic data structure (i.e., a bit array) that is used to test whether an element is a member of a set. False positives are possible, but false negatives are not. Elements can be added to the array, but not removed. The more elements that are added to the bit array, the larger the probability of false positives.

In one example, an identity (e.g., group identity may be converted into a sequence of bits by some conversion function (e.g., hash function). For instance, k different hash functions may be defined to convert/transform different identities. Each hash function may map or hash an identity (i.e., an element in a set) to one of m array positions of a bit array with a uniform random distribution. Identities are concealed or obfuscated by the Bloom filter data structure by virtue of the hashing of the identities prior to mapping (indexing) to the Bloom filter data structure (e.g., a vector). That is, unless a recipient peer node has a particular identity, it would not be able to identify that identity (or any other identity) within a received Bloom filter data structure.

FIG. 3 illustrates one example of generating a Bloom filter vector that conceals a plurality of identities for a requesting peer node. An empty Bloom filter vector (BFV) is a bit array of m bits, all set to a default value (e.g., zero (0)). The BFV is herein defined to have positions 0 to m−1. A plurality of hash functions H1, H2, H3, ..., Hk may be known or agreed upon by a requesting peer node and a validating/storing peer node. Note that while this example illustrates that a different hash function is used for each identity, other implementations may use the same (e.g., a single) hash function for all the identities.

In this example, the requesting peer node (e.g., Peer A) may have a plurality of identities or group identities (e.g., yahoo-A, gmail-A, facebook-A, amazon-A, ebay-A, company-A, school-A, etc.) making up an identity set ($S_A$) for peer node A. Each identity in the set SA may be a hashed to obtain a hash value. In this example, just 3 bits of the hash value are used to generate a position or offset index. That position or offset index is then set on the BFV. As can be perceived, a first identity (yahoo-A) is hashed (using a first hash function H1) to obtain the offset or position index "2", resulting in the second position of the BFV being set to one (1). For each identity, the resulting Bloom filter representation for each such offset or position index is denoted by $f_{A1}$, $f_{A2}$, $f_{A3}$, $f_{A4}$, $f_{A5}$, and $f_{A6}$. This process is repeated for each of the other identities to obtain a resulting BFV, in which each of the position or offset bits obtained from the hashing of the identities is set to a non-default value (e.g., one (1)). Note that false positives are possible under this scheme. For instance, identities yahoo-A and amazon-A both resulted in the same BLV position or offset index (e.g., 2).

To reduce the probability of false positives, a greater number of the hash bits for each identity may be used. Additionally, to further reduce this probability of false positives, a greater number of bits in the BFV may be set for each identity.

FIG. 4 illustrates an example of generating a Bloom filter vector that conceals a plurality of identities for a requesting peer node while reducing the probability of false positives. In this example, the Bloom filter vector (BFV) is a bit array of m=4096 bits, which are initialized to a default value (e.g., zero (0)). The BFV is herein defined to have positions 0 to m−1 and a plurality of hash functions H1, H2, H3, Hk may be known or agreed upon by a requesting peer node and a validating/storing peer node.

In this example, the requesting peer node (e.g., Peer A) may have a plurality of identities or group identities (e.g., yahoo-A, gmail-A, facebook-A, amazon-A, ebay-A, company-A, school-A, etc.) making up an identity set ($S_A$) for peer node A. Each identity in the set $S_A$ may be a hashed by a plurality of the hash functions to obtain a plurality of hash values that serve as position or offset indexes into the BFV. In this example, 12 bit hash values are used to generate each position or offset index. Thus, the number k of hash function also corresponds to an equal number k of indexes in this example. These position or offset indexes are then set on the BFV. As can be perceived, a first identity (yahoo-A) is hashed (using a plurality of hash functions H1, H2, H3, H4, H5, Hk) to obtain a first plurality of offset or position indexes. This first plurality of offset or position indexes are then used to set the corresponding bits of the BFV to a non-default value (e.g., one (1)). For a particular identity i, the resulting Bloom filter representation for each such offset or position index is denoted by $f_{Ai\text{-}1}$, $f_{Ai\text{-}2}$, $f_{Ai\text{-}3}$, ..., $f_{Ai\text{-}k}$. This process is then repeated for each of the remaining identities such that a plurality of offset or position indexes are generated for each identity.

While the approach illustrated in FIG. 4 reduces the probability of false positives since a plurality of offset or position indexes are generated for each identity, calculating a plurality of different hashes for each identity may be resource intensive.

Figure 5:
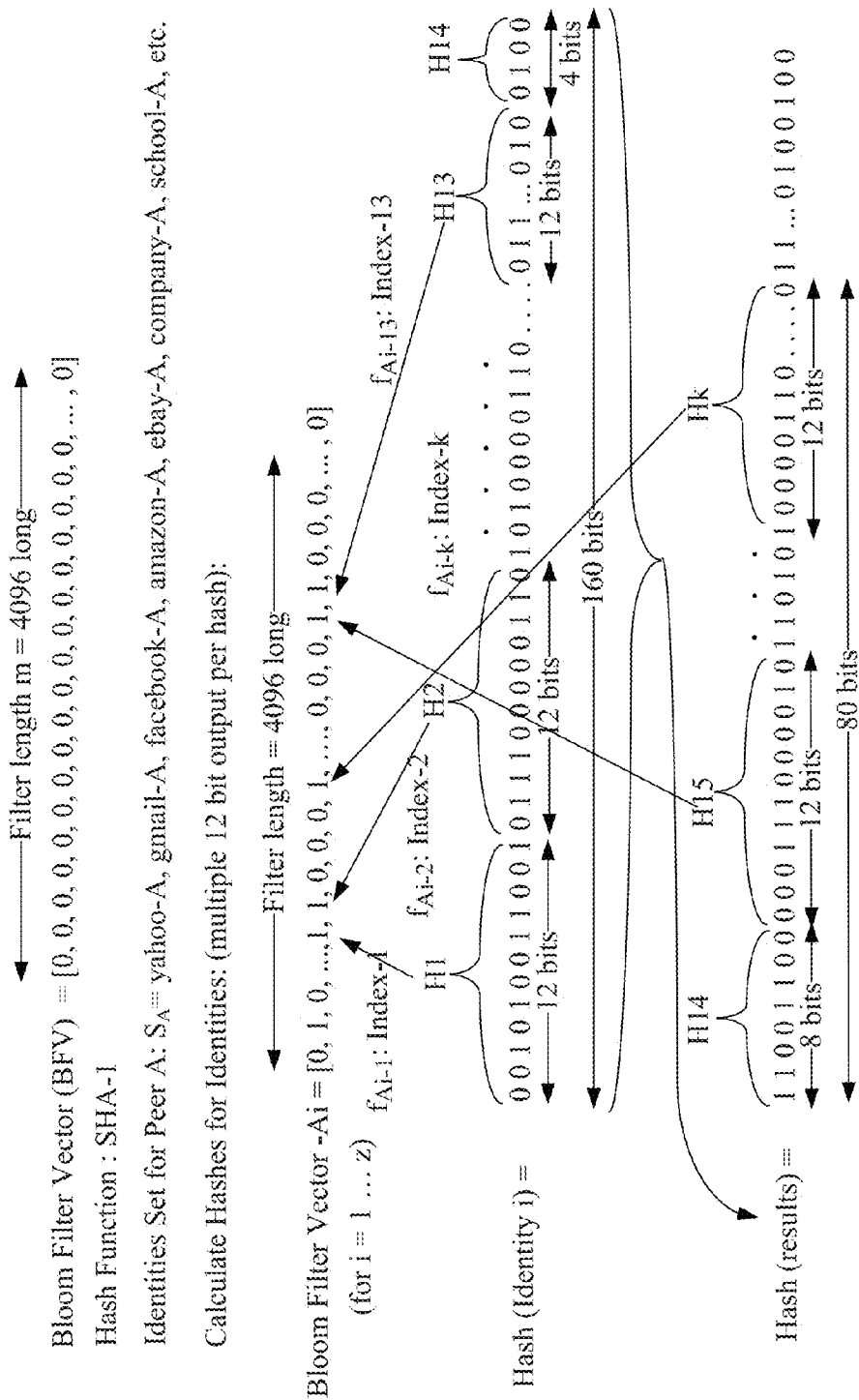
FIG. 5 illustrates another example of generating a Bloom filter vector that conceals a plurality of identities for a requesting peer node while reducing the probability of false positives.

FIG. 5 illustrates another example of generating a Bloom filter vector that conceals a plurality of identities for a requesting peer node while reducing the probability of false positives. In contrast to the implementation of FIG. 4, this method uses a single hash function (e.g., a SHA-1 function) to generate a plurality of offset or position indexes for each identity. For each identity (e.g., identity i), a single hash function is applied to the identity to generate a sufficiently long string of bits that can be partitioned into a plurality of segments, where each segment H1, H2 ... H13, H14, H15, ... Hk may be considered the result of different hash functions and serve as an offset or position index into a Bloom filter vector (BFV). That is, each of the k segments corresponds to an offset or position index. For a particular identity i, the resulting Bloom filter representation may be defined by a set of offset or position indexes $f_{Ai}$, where such set of offset of position indexes $f_{Ai}$ may include a plurality of offset or position indexes denoted by $f_{Ai-1}, f_{Ai-2}, f_{Ai-3}, \ldots, f_{Ai-k}$.

Note that, in this example the selected hash function is a SHA-1 function that generates a 160 bit output. Because k=20 distinct indexes are desired in this example for each identity and each index is twelve (12) bits long, a total of two hundred forty 240 bits are needed. Consequently, additional bits may be generated by using the resulting 160 bits from the initial hash operation as input for a second hash operation. In this example, eighty (80) bits from the second hash operation are used to complete the two hundred forty bits (i.e., the 160 bits from the first hash operation are concatenated with 80 bits from the second hash operation). It should also be noted that a hash segment H14 may span between the first and second hashes (i.e., 4 bits from the first hash operation and 8 bits from the second hash operation). A non-default value (e.g., one (1)) is set in the BFV for each of the indexes generated. This process may then be repeated for each identity of user of a peer node.

Once a BFV is generated to conceal one or more identities, the BFV is transmitted by the requesting peer node to a storing or validating peer node. If not previously agreed upon, the requesting peer node may also provide or send the length m of the BFV, the number k of offset or position indexes used, and/or the bit length of each indexing segment. The storing or validating peer node receives the BFV (and possibly an indication of the hash function used, the BFV length m, number k of offset or position indexes used, and/or the index bit length) and may perform set operations to ascertain whether a match is found that grants access to the requested digital object.

FIGS. 6 and 7 illustrate examples of using a Bloom filter vector to match identities between a requesting peer node and a storing or validating peer node while concealing such identities. The storing or validating node may perform similar operations as those used by the requesting peer node to generate the BFV. In some implementations, a Bloom filter vector for object-x (BFV-Object-x) may have been pre-generated with the same hash function, BFV length m, number k of offset or position indexes, and/or bit length of each indexing segment as used by the requesting peer node. In other implementations, the BFV-Object-x may be generated upon receipt of a digital object request from the requesting peer node. In one implementation, each BFV-Object-x may represent a single identity allowed to access digital object-x. If digital object-x has a plurality of access identities, a separate BFV-Object-x vector may be computed for each access identity.

A BFV-A may have been received from a requesting peer node A as part of a request to access a digital object-x. In this example, the received BFV-A may be representative of a plurality of identities defined by a plurality of offset or position index sets $f_{A1}, f_{A2}, f_{A3}, \ldots, f_{An}$. Each of the offset or position index sets $f_{A1}, f_{A2}, f_{A3}, \ldots, f_{An}$ may be representative of one or more offset or position indexes in the Bloom filter vector BFV-A.

In a first example, illustrated in FIG. 6, one or more BFV-Object-x vectors may be generated for access identity that is permitted to access digital object-x. The one or more identities that are permitted access to digital object-x may be referred to as a set $S_x$, wherein such set is defined by offset or position index sets $f_{x1}, f_{x2}, f_{x3}, \ldots, f_{xg}$. In this example, none of the offset or position index sets received (sets $f_{A1}, f_{A2}, f_{A3}, \ldots, f_{An}$) intersect or match the offset or position index sets (sets $f_{x1}, f_{x2}, \ldots, f_{xg}$) for the digital object-x; meaning there is no match between the requesting peer node identities and an access identity for the digital object-x.

In a second example, illustrated in FIG. 7, a BFV-Object-x may be generated for one or more identities that are permitted access to digital object-x. The one or more identities that are permitted access to digital object-x may be referred to as a set Sx, wherein such set is defined by offset or position index sets $f_{x1}, f_{x2}, f_{x3}, \ldots f_{xf}$. In this example, one of the offset or position index sets received (sets $f_{A1}, f_{A2}, f_{A3}, \ldots, f_{An}$) intersect or match one of the offset or position index sets (sets $f_{x1}, f_{x2}, \ldots, f_{xf}$) for the digital object-x (e.g., all 1's in $f_{x2}$ are found in BFV-A). Hence, there is a match between a requesting peer node identity and an identity for the digital object-x and access to the digital object-x may be granted to the requesting peer node.

The matching of identities may be performed using set operations between the Bloom filter vector BFV-A for the requesting peer node and the Bloom filter vector BFV-Object-x for the requested digital object. The simplest set operation provided by Bloom Filter is to test if an identity (element) is in a set of identities $S_A$ (for the requesting peer node) or not using the Bloom filter vectors. Suppose a storing or validating peer node B receives a Bloom filter vector BFV-A representing a set of identities $S_A$ for a peer node A. The digital object-x may have one or more access identities (set of identities $S_x$) that are permitted to access the digital object-x. Thus, the storing or validating peer node B may also compute one or more Bloom filter vectors BFV-Object-x for each of the access identities (elements) associated with the digital object-x. That is, each access identity may be represented by a separate BFV-Object-x (i.e., BFV-Object-x1, BFV-Object-x2, ..., BFV-Object-xg). If an access identity (in set $S_x$) is found in set $S_A$, for every bit "1" in BFV-Object-x, the corresponding bit position in BFV-A must also be one. For example, in FIG. 6 it can be perceived that every access identity (represented by vectors BFV-Object-x1, BFV-Object-x2, ..., BFV-Object-xg) has a "1" not found in a corresponding offset or position of the BFV-A. By contrast, in FIG. 7 it can be appreciated that every "1" in BFV-Object-x2 (or $f_{x2}$) is found in BFV-A. Thus, peer node B can easily test if one or more access identities (elements) in set $S_x$ belong to set $S_A$.

According to one example, an identity match may be ascertained by performing an intersection operation $S_A \cap S_B$, i.e., storing or validating peer node B performs bit-wise AND operation on vectors BFV-A and BFV-Object-xi to obtain a new vector representing the intersection set BFV-INT=BFV-A AND BFV-Object-xi.

There are several ways that matched identities can be returned from the storing or validating peer node B to the requesting peer node A.

In the first method, the storing or validating peer node B may send all or part of matched identities to the requesting peer node A in its identity form (e.g. the actual email address, group name, domain name, etc.). Once the requesting peer node A receives the response, it knows exactly which are the matching identities since they are explicitly identified in the response. Any false positives may also be discovered in the Bloom filter matching since the requesting peer node A is able to ascertain whether it possesses any of the identities identified in the response. A drawback in this method is that it may reveal the matched identities to intermediate routing nodes. Also, if the number of matched identities is large, sending all matched identities may incur a large message overhead.

According to a second method, the storing or validating peer node B may send a resulting Bloom filter vector (e.g., obtained from a bit-wise AND operation between BFV-A and BFV-Object-x) to the requesting peer node A instead of a set representation. That is, instead of responding to the requesting peer node A with the set intersection results (i.e., the specific matching identities), peer node B simply replies to the requesting peer node A with a vector BFV-INT representing the intersection set. The requesting peer node A then performs set element tests using the received BFV-INT to find out which of its identities are in the matched result. This method may prevent intermediate nodes on the routing path from identifying the matching identity set between peer node A and peer node B. It also limits the message overhead to the size of Bloom filter vector used, which is typically small (e.g., 4096 bits long). However, if there is a false positive in the matched result, peer node A will not be able to discover the false positive until the matched identity is used (e.g. for access control) or by implementing an additional authentication step.

In some implementations, the small chance of a false positive can be corrected by protocol design. For instance, even after an identity match has been found, additional authentication of the matching identity may be provided. For example, an identity match may involve matching two domain names. For instance, a requesting peer node may include a first identity (i.e., group identity) of "university-.com" while the digital object-x is accessible by anyone having an account under "university.com". Thus, the initial identity match using a Bloom filter vector is between the domain "university.com". If such initial match is found, a subsequent exchange may take place to authenticate the requesting peer node's (or user's) membership in such group.

In one example, after an initial identity match has been found, the requesting peer node may provide additional information to prove its right to access digital object-x. For example, the requesting peer node may have previously obtained a signed certificate or a user identifier from an administrator of the group (e.g., administrator of "university.com"). For instance, upon becoming a member of the group, the group administrator may have granted the requesting peer node a certificate signed by the private key of the group. In one example, such certificate may be a user identity that by the private key of the group.

Exemplary Requesting Peer Node and Operation Therein

Figure 8:
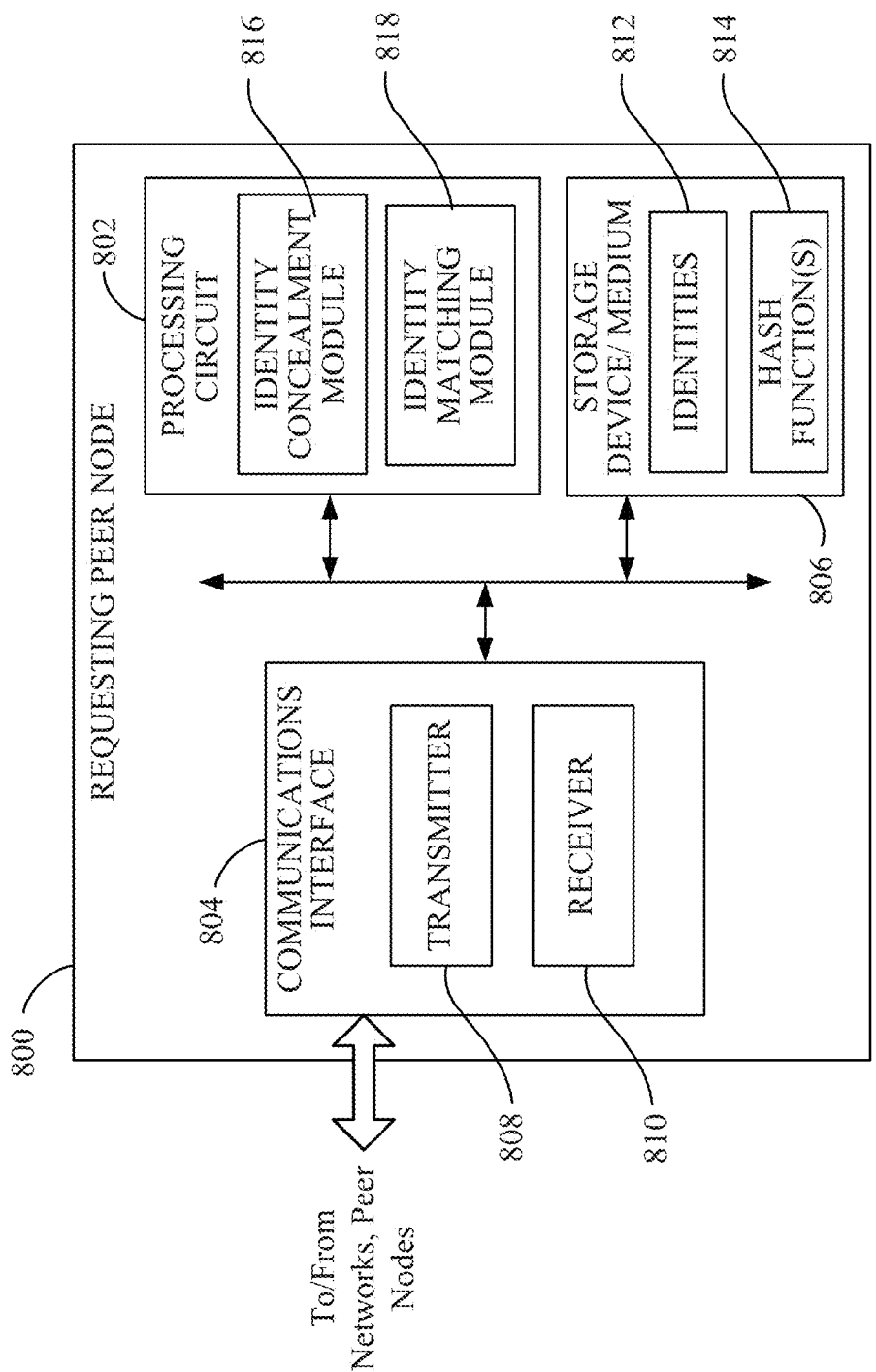
FIG. 8 is a block diagram illustrating a requesting peer node according to one example.

FIG. 8 is a block diagram illustrating a requesting peer node according to one example. The requesting peer node 800 may include a processing circuit 802 coupled to a communication interface 804 and a storage device or medium 806. The communication interface 804 may include or implement a transmitter 808 (e.g., a wireless transmission circuit or module) and/or a receiver 810 (e.g., a wireless receiver circuit or module) which may be configured to facilitate transmissions to and/or from a network (e.g., a wireless network) and/or with one or more peer nodes of an overlay network.

The storage device or medium 806 may be, for example, a memory device, a data storage device, a processor-readable or computer-readable medium, that may be adapted to store (either temporarily or permanently) one or more instructions, which when executed, perform one or more functions of the requesting peer node, including communicating with other peer nodes, requesting access to digital objects stored in other nodes of an overlay network, and/or concealing one or more of its identities during access control operations. The storage device or medium 806 may also store one or more identities (e.g., group names, company names, school names, association names, etc.) associated with a user of the requesting peer node 800 or associated with the requesting peer node 800 itself. The storage device or medium 806 may also serve to store one or more hash functions 814 that may serve to conceal or obfuscate the one or more identities 812 during access control operations over the overlay network.

An identity concealment module 816 may be implemented by the processing circuit to generate a data structure that cryptographically conceals one or more identities 812 (e.g., within a shared data space of the data structure). Such data structure may be sent via the communication interface 804 to a validating peer node as part of a request to access a digital object. In response, the requesting peer node 800 may receive information from the validating peer node indicating whether any of the one or more identities is a match to access the requested digital object. Such information may be an identity for which the validating peer node found a match. An identity matching module 818 may identify a first identity as a match from the received information, selects a certificate corresponding to the first identity, and/or sends the selected certificate to the validating peer node to authenticate access to the digital object.

Figure 9:
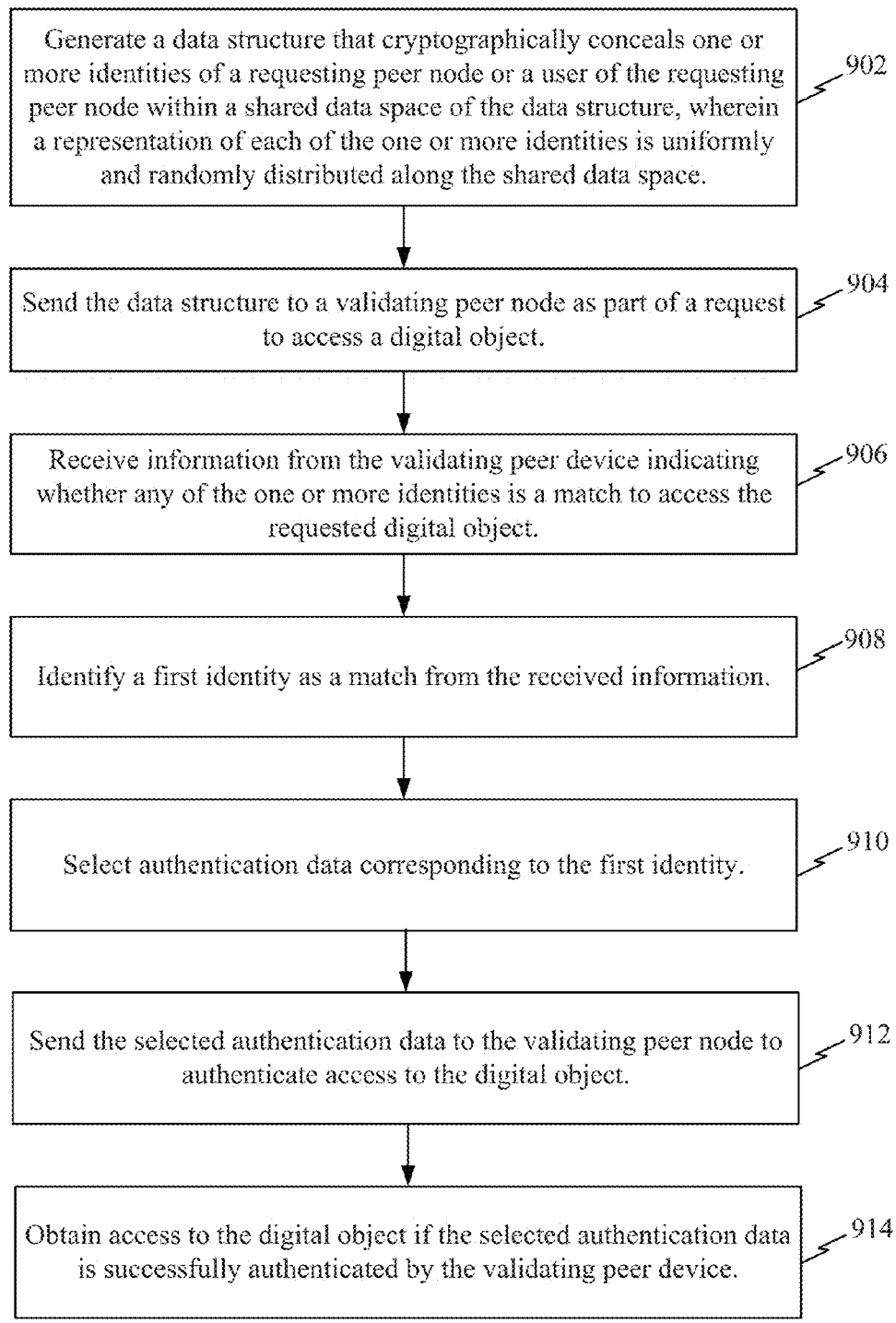
FIG. 9 illustrates a method operational in a requesting peer node for protecting the privacy of its identities during an access control.

FIG. 9 illustrates a method operational in a requesting peer node for protecting the privacy of its identities during an access control. The requesting peer node may obtain one or more identities (e.g., group identities or names). Such identities may indicate groups of which the requesting peer node or user thereof is a member. For example, the one or more identities may be group identities and digital objects for said groups may be available to (or accessible by) only members of said groups.

Along with the one or more identities, the requesting peer node may include corresponding certificates that allow the requesting peer node (or user thereof) to prove that it is a member of each group associated with each identity.

The requesting peer node may generate a data structure that cryptographically conceals the one or more identities of the requesting peer node or a user of the requesting peer node within a shared data space of the data structure 902. That is, the shared data space may distribute a representation of each of the one or more identities uniformly and/or randomly along the shared data space.

The data structure may then be sent to a validating peer node as part of a request to access a digital object 904. The one or more identities may be uniformly and/or randomly distributed along the shared data space. For instance, the identities may be converted to binary representations that span the shared data space. For example, in FIG. 5, the non-default values (one bits (1)) set for each identity are randomly and/or uniformly positioned along the shared data space. In one example, the requesting peer node and the validating peer node may communicate wirelessly over an overlay peer-to-peer network. "Uniform" distribution refers to setting the position of non-default values (bits 1) for each identity at each bit position of the shared data space with equal likelihood. "Random" distribution refers to the appearance of non-default values (bits 1) at a given bit position of the shared data space being determined by a probabilistic process (e.g., a random or pseudorandom position selection process).

In response to sending the data structure, the requesting peer node may receive information from the validating peer node indicating whether any of the one or more identities is a match to access the requested digital object 906.

The requesting peer node may then seek to prove its association with the matched identity. A first identity may be identified as a match from the received information 908. A certificate corresponding to the first identity may then be selected by the requesting peer node 910. The selected certificate is then sent by the requesting peer node to the validating peer node to authenticate access to the digital object 912. If the selected certificate is successfully authenticated by the validating peer node, the requesting peer node may obtain access to the digital object 914.

According to one example, the data structure may be a binary vector in which each of the one or more identities are represented by a plurality of bits that are uniformly and randomly distributed along the binary vector. The binary vector may be generated by: (a) applying a cryptographic hash function to a first identity to generate a binary string; (b) partitioning the binary string into binary segments; (c) converting each binary segment into a position index within the binary vector; and/or (d) setting a vector value at the indicated position index of the binary vector to one. In a similar fashion, a plurality of additional identities may be converted to position indexes that are set in the binary vector to one.

In one example, such data structure is a Bloom filter vector in which each identity is represented by a plurality of bits uniformly and randomly distributed along the binary vector. To this extent, the data structure may be a probabilistic data structure where false positive identity matches are possible. That is, a Bloom filter vector will not produce false negatives but may produce false positives.

Figure 10:
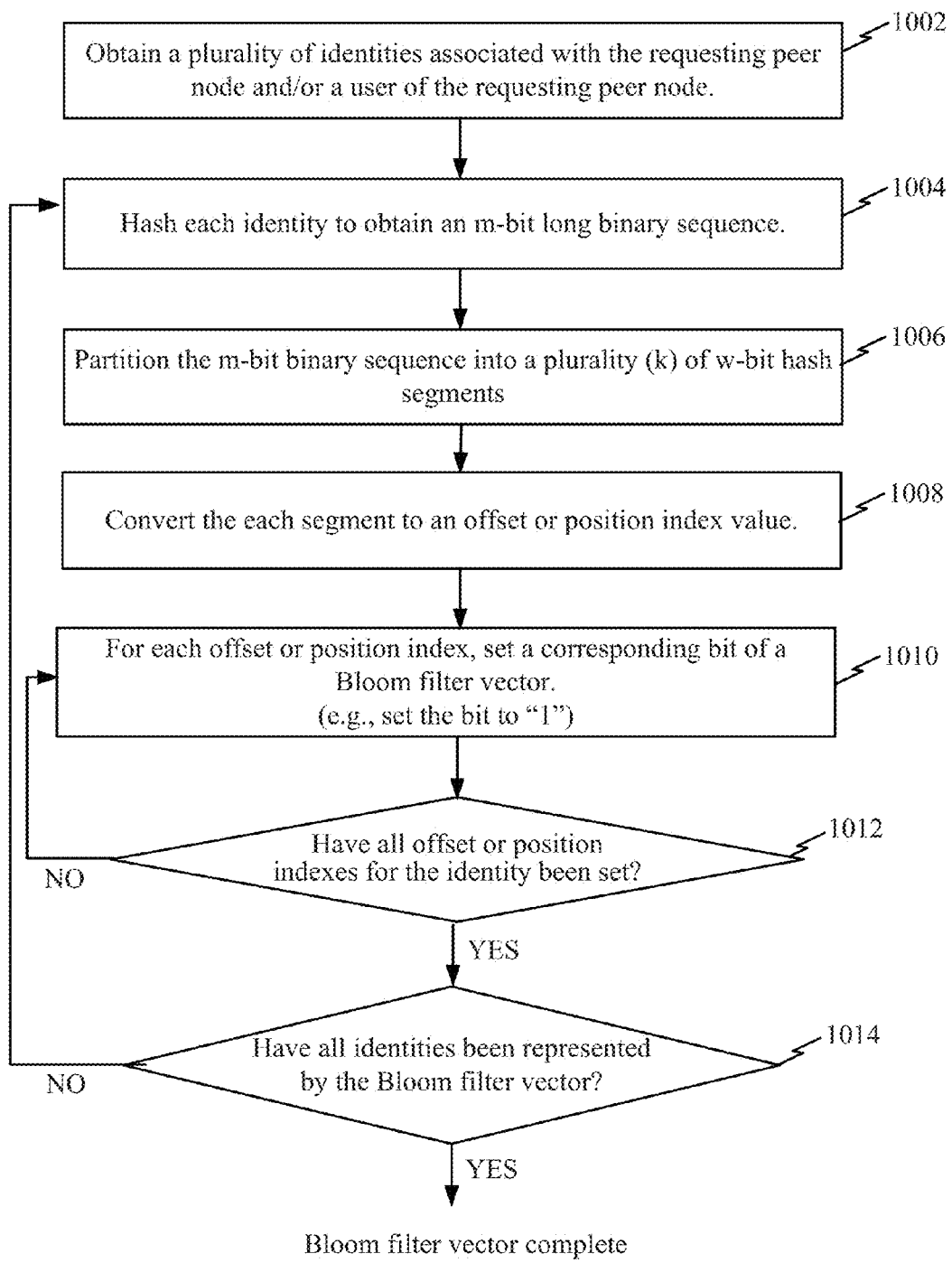
FIG. 10 illustrates a method operational in a requesting peer node for concealing identities in a Bloom filter vector.

FIG. 10 illustrates a method operational in a requesting peer node for concealing identities in a Bloom filter vector. A plurality of identities associated with the requesting peer node and/or a user of the requesting peer node are obtained 1002. For instance, such identities may be email addresses, membership, account information that may serve to verify a group membership. Each identity may then be hashed to obtain an m-bit long binary sequence 1004. The binary sequence may be partitioned into a plurality (k) of w-bit hash segments, where w<m. For instance, for a binary sequence that is m=240 bits long and segments that are w=12 bits long, the number of segments is k=20. The value of each segment may serve as an offset or position index 1008. For each offset or position index, a corresponding bit of a Bloom filter vector is set (e.g., set the bit to "1") 1010. This process is repeated for every offset or position index of an identity 1012 and for all identities being used or selected 1014. In this manner, the Bloom filter vector may represent a plurality of identities, with each identity represented by a plurality of set bits in the Bloom filter vector.

Exemplary Storing/Validating Peer Node and Operation Therein

Figure 11:
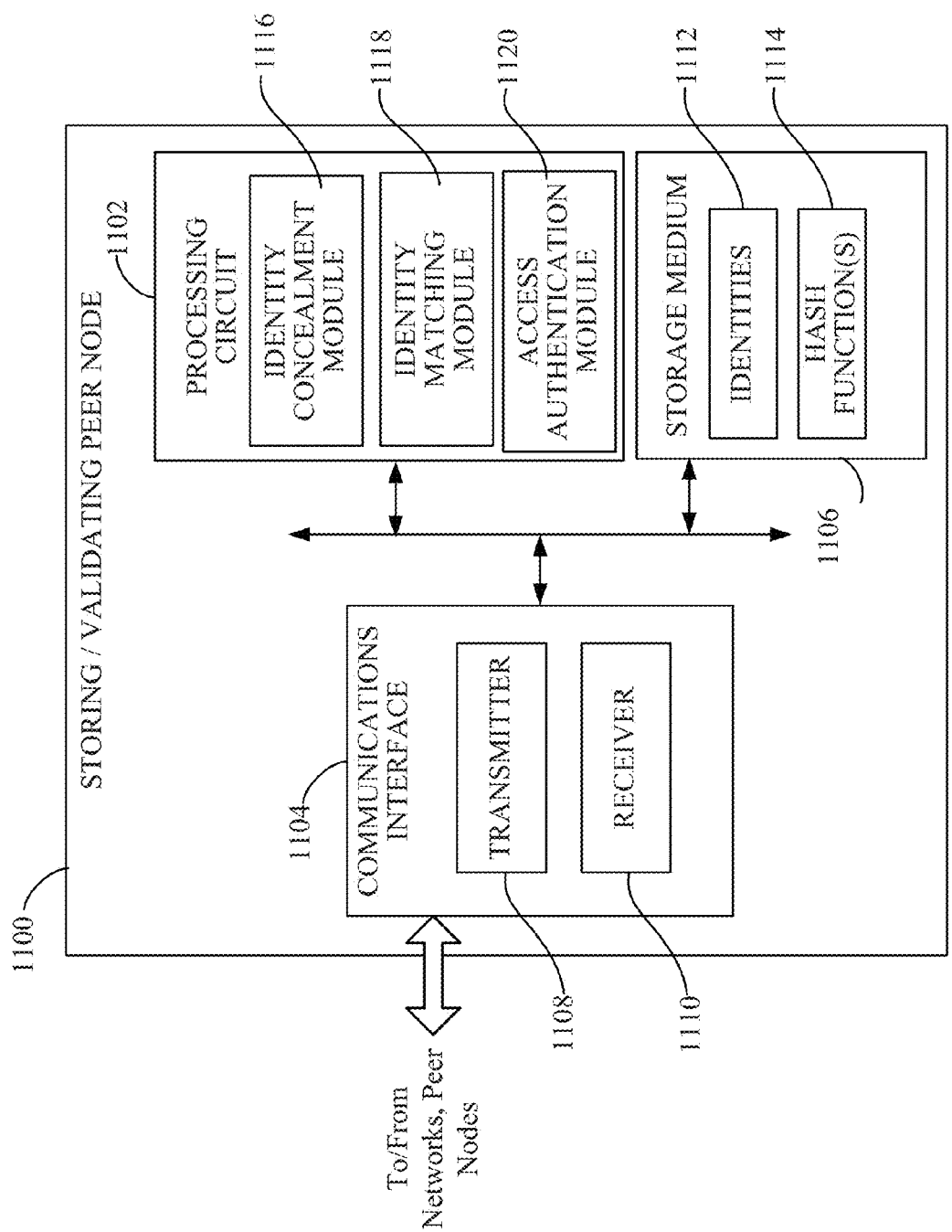
FIG. 11 is a block diagram illustrating a validating/storing peer node according to one example.

FIG. 11 is a block diagram illustrating a validating/storing peer node according to one example. The validating/storing peer node 1100 may include a processing circuit 1102 coupled to a communication interface 1104 and a storage device or medium 1106. The communication interface 1104 may include or implement a transmitter 1108 (e.g., a wireless transmission circuit or module) and/or a receiver 1110 (e.g., a wireless receiver circuit or module) which may be configured to facilitate transmissions to and/or from a network (e.g., a wireless network) and/or with one or more peer nodes of an overlay network.

The storage device or medium 1106 may be, for example, a memory device, a data storage device, a processor-readable or computer-readable medium, that may be adapted to store (either temporarily or permanently) one or more instructions, which when executed, perform one or more functions of the validating/storing peer node, including communicating with other peer nodes, validating access to digital objects stored in other nodes of an overlay network, and/or performing identity matching during access control operations. The storage device or medium 1106 may also store one or more identities (e.g., group names, company names, school names, association names, etc.) associated with particular digital objects. The storage device or medium 1106 may also serve to store one or more hash functions 1114 that may serve to conceal or obfuscate the one or more identities 1112 during access control operations over the overlay network.

An identity matching module 1118 may receive a data structure (via the communication interface 1104) from a requesting peer node as part of a request to access a digital object, where the received data structure cryptographically conceals one or more identities of the requesting peer node or a user of the requesting peer node within a shared data space of the data structure. The identity matching module 1118 may obtain one or more access identities that are allowed to access the digital object. An identity concealment module 1116 may generate a second data structure for each of the access identities, where the second data structure cryptographically conceals an access identity of the digital object. The identity matching module 1118 then performs a comparison between the received data structure and the second data structure to ascertain whether there is an intersection of identities indicating a potential match. The identity matching module 1118 may then send information to the requesting peer node indicating whether any of the one or more identities of the requesting peer node is a match to access the requested digital object. In response, an access authentication module 1120 may receive a certificate associated with a matching identity identified by the validating peer device. The access authentication module 1120 may then authenticate the certificate to verify that the requesting peer node is a member of a group identified by the matching identity.

If the received certificate is successfully authenticated, then access to the requested digital object is granted to the requesting peer node.

Figure 12:
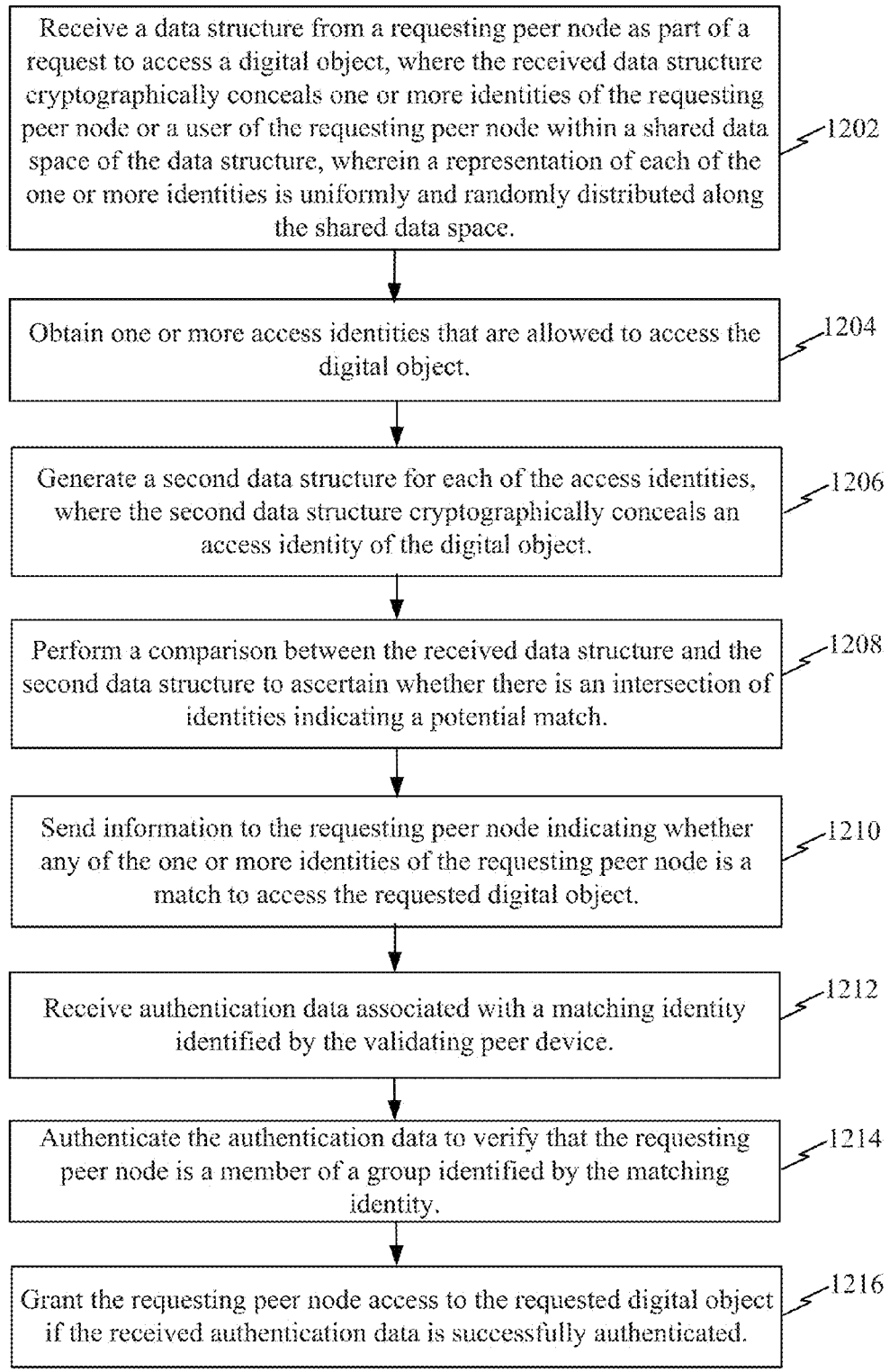
FIG. 12 illustrates a method operational in a validating peer node for protecting the privacy of requesting peer node identities while performing access control.

FIG. 12 illustrates a method operational in a validating peer node for protecting the privacy of requesting peer node identities while performing access control. A data structure may be received from a requesting peer node as part of a request to access a digital object, where the received data structure cryptographically conceals one or more identities of the requesting peer node or a user of the requesting peer node within a shared data space of the data structure 1202. For instance, a representation of each of the one or more identities may be uniformly and/or randomly distributed along the shared data space. In various implementations, the requested digital object may be stored by a different storing peer node or by the validating peer node itself. In one example, the received data structure may be a binary vector in which each of the one or more identities of the requesting peer node are represented by a plurality of bits that are uniformly and randomly distributed along the binary vector. For instance, the data structure may be a Bloom filter vector in which each identity is represented by a plurality of bits uniformly and randomly distributed along the binary vector.

The validating peer node may then obtain one or more access identities that are allowed to access the digital object 1204 and generates a second data structure for each of the access identities, where the second data structure cryptographically conceals an access identity of the digital object 1206. A comparison may then be performed between the received data structure and the second data structure to ascertain whether there is an intersection of identities indicating a potential match 1208. The validating peer node may then send information to the requesting peer node indicating whether any of the one or more identities of the requesting peer node is a match to access the requested digital object 1210. In various examples, the information sent by the validating peer node to indicate a match may be (a) a matching identity or (b) a concealed version of the matching identity.

In response, the validating peer node may receive a certificate associated with a matching identity identified by the validating peer device 1212. The received certificate may be authenticated to verify that the requesting peer node is a member of a group identified by the matching identity 1214. If the received certificate is successfully authenticated, access to the requested digital object is granted to the requesting peer node 1216.

In one implementation, the second data structure may be a binary vector that is generated by: (a) applying a cryptographic hash function to a first identity to generate a binary string; (b) partitioning the binary string into binary segments; (c) converting each binary segment into a position index within the binary vector; and/or (d) setting a vector value at the indicated position index of the binary vector to one. Note that different second data structures may be generated for each identity that is allowed access to the digital object. This way, each second data structure may be individually compared to the received data structure to identify any potential matching identities.

One or more of the components, steps, features and/or functions illustrated in FIGS. 1, 2, 3, 4, 5, 6, 7, 8, 9, 10, 11 and/or 12 may be rearranged and/or combined into a single component, step, feature or function or embodied in several components, steps, or functions. Additional elements, components, steps, and/or functions may also be added without departing from the scope of the present disclosure. The apparatus, devices, components and/or transmission frames illustrated in FIGS. 1, 8 and/or 11 may be configured to perform one or more of the methods, features, or steps described in FIGS. 2-7, 9-10, and/or 12. The novel algorithms described herein may also be efficiently implemented in software and/or embedded in hardware.

Also, it is noted that at least some implementations have been described as a process that is depicted as a flowchart, a flow diagram, a structure diagram, or a block diagram. Although a flowchart may describe the operations as a sequential process, many of the operations can be performed in parallel or concurrently. In addition, the order of the operations may be re-arranged. A process is terminated when its operations are completed. A process may correspond to a method, a function, a procedure, a subroutine, a subprogram, etc. When a process corresponds to a function, its termination corresponds to a return of the function to the calling function or the main function.

Moreover, embodiments may be implemented by hardware, software, firmware, middleware, microcode, or any combination thereof. When implemented in software, firmware, middleware or microcode, the program code or code segments to perform the necessary tasks may be stored in a machine-readable medium such as a storage medium or other storage(s). A processor may perform the necessary tasks. A code segment may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted via any suitable means including memory sharing, message passing, token passing, network transmission, etc.

The terms "machine-readable medium", "computer-readable medium", and/or "processor-readable medium" may include, but are not limited to portable or fixed storage devices, optical storage devices, and various other non-transitory mediums capable of storing, containing or carrying instruction(s) and/or data. Thus, the various methods described herein may be partially or fully implemented by instructions and/or data that may be stored in a "machine-readable medium", "computer-readable medium", and/or "processor-readable medium" and executed by one or more processors, machines and/or devices.

The methods or algorithms described in connection with the examples disclosed herein may be embodied directly in hardware, in a software module executable by a processor, or in a combination of both, in the form of processing unit, programming instructions, or other directions, and may be contained in a single device or distributed across multiple devices. A software module may reside in RAM memory, flash memory, ROM memory, EPROM memory, EEPROM memory, registers, hard disk, a removable disk, a CD-ROM, or any other form of storage medium known in the art. A storage medium may be coupled to the processor such that the processor can read information from, and write information to, the storage medium. In the alternative, the storage medium may be integral to the processor.

Those of skill in the art would further appreciate that the various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system.

The various features of the embodiments described herein can be implemented in different systems without departing from the scope of the disclosure. It should be noted that the foregoing embodiments are merely examples and are not to be construed as limiting the disclosure. The description of the embodiments is intended to be illustrative, and not to limit the scope of the claims. As such, the present teachings can be readily applied to other types of apparatuses and many alternatives, modifications, and variations will be apparent to those skilled in the art.

What is claimed is:

1. A method operational in a requesting peer node, comprising:

generating a first data structure that cryptographically conceals one or more identities of the requesting peer node or a user of the requesting peer node within a shared data space of the first data structure, wherein a representation of each of the one or more identities is uniformly and randomly distributed along the shared data space; and sending the first data structure to a validating peer node as part of a request to access a digital object stored by the validating peer node, wherein the digital object is accessible to the requesting peer node if the one or more identities of the requesting peer node match corresponding one or more identities of the validating peer node by sending authentication data corresponding to the matching access identity to the validating peer node.

2. The method of claim 1, further comprising: receiving information from the validating peer node indicating whether any of the one or more identities of the requesting peer node or the user of the requesting peer node is a match to a corresponding identity of the validating peer node, thereby enabling access to the digital object.

3. The method of claim 2, further comprising: identifying a first identity as a match from the received information;
selecting authentication data corresponding to the first identity; and
sending the selected authentication data to the validating peer node to authenticate access to the digital object.

4. The method of claim 3, further comprising: obtaining access to the digital object if the selected authentication data is successfully authenticated by the validating peer node.

5. The method of claim 2, wherein the information received from the validating peer node includes a second data structure, the second data structure cryptographically concealing an access identity of the digital object and further comprising: comparing the first data structure and the second data structure to ascertain whether there is an intersection of identities indicating a potential match; and accessing the digital object based on the intersection of identities.

6. The method of claim 1, wherein the one or more identities of the requesting peer node or the user of the requesting peer node comprise group identities and the digital object includes data for which access is limited to members of a group corresponding to a certain one of the group identities.

7. The method of claim 1, wherein the requesting peer node and the validating peer node communicate wirelessly over an overlay peer-to-peer network.

8. The method of claim 1, wherein the first data structure is a binary vector in which each of the one or more identities are represented by a plurality of bits that are uniformly and randomly distributed along the binary vector.

9. The method of claim 8, wherein the binary vector is generated by: applying a cryptographic hash function to a first identity to generate a binary string; partitioning the binary string into binary segments; converting each binary segment into a position index within the binary vector; and setting a vector value at an indicated position index of the binary vector to a non-default value.

10. The method of claim 9, wherein a plurality of additional identities are converted to position indexes that are set in the binary vector to the non-default value.

11. The method of claim 1, wherein the first data structure is a Bloom filter vector in which each identity is represented by a plurality of bits uniformly and randomly distributed along the Bloom filter vector.

12. The method of claim 1, wherein the first data structure is a probabilistic data structure where false positive identity matches are possible.

13. A requesting peer node, comprising: a communication interface for communicating with other peer nodes over an overlay network; a processing circuit coupled to the communication interface, the processing circuit adapted to:

generate a first data structure that cryptographically conceals one or more identities of the requesting peer node or a user of the requesting peer node within a shared data space of the first data structure, wherein a representation of each of the one or more identities is uniformly and randomly distributed along the shared data space; and send the first data structure to a validating peer node as part of a request to access a digital object stored by the validating peer node, wherein the digital object is accessible to the requesting peer node if the one or more identities of the requesting peer node match or the user of the requesting peer node corresponding one or more identities of the validating peer node by sending authentication data corresponding to the matching access identity to the validating peer node.

14. The requesting peer node of claim 13, wherein the processing circuit is further adapted to: receive information from the validating peer node indicating whether any of the one or more identities of the requesting peer node or the user of the requesting peer node is a match to a corresponding identity of the validating peer node, thereby enabling access to the requested digital object.

15. The requesting peer node of claim 14, wherein the processing circuit is further
adapted to: identify a first identity as a match from the received information; select authentication data corresponding to the first identity; and send the selected authentication data to the validating peer node to authenticate access to the digital object.

16. The requesting peer node of claim 15, wherein the processing circuit is further adapted to: obtain access to the digital object if the selected authentication data is successfully authenticated by the validating peer node.

17. The requesting peer node of claim 14, wherein the information received from the validating peer node includes a second data structure, the second data structure cryptographically concealing an access identity of the digital object and wherein the processing circuit is further adapted to: compare the first data structure and the second data structure to ascertain whether there is an intersection of identities indicating a potential match; and access the digital object based on the intersection of identities.

18. The requesting peer node of claim 13, wherein the first data structure comprises a binary vector in which each of the one or more identities are represented by a plurality of bits that are uniformly and randomly distributed along the binary vector.

19. The requesting peer node of claim 18, wherein the binary vector is
generated by: applying a cryptographic hash function to a first identity to generate a binary string; subdividing the binary string into binary segments; converting each binary segment into a position index within the binary vector; and setting a vector value at an indicated position index of the binary vector to a non-default value.

20. A requesting peer node, comprising:
means for generating a first data structure that cryptographically conceals one or more identities of the requesting peer node or a user of the requesting peer node within a shared data space of the first data structure, wherein a representation of each of the one or more identities is uniformly and randomly distributed along the shared data space; and means for sending the first data structure to a validating peer node as part of a request to access a digital object stored by the validating peer node, wherein the digital object is accessible to the requesting peer node if the one or more identities of the requesting peer node or the user of the requesting peer node match corresponding one or more identities of the validating peer node by sending authentication data corresponding to the matching access identity to the validating peer node.

21. The requesting peer node of claim 20, further comprising: means for receiving information from the validating peer node indicating whether any of the one or more identities of the requesting peer node or the user of the requesting peer node is a match to a corresponding identity of the validating peer node, thereby enabling access to the requested digital object.

22. The requesting peer node of claim 21, further comprising: means for identifying a first identity as a match from the received information; means for selecting authentication data corresponding to the first identity; and means for sending the selected authentication data to the validating peer node to authenticate access to the digital object.

23. The requesting peer node of claim 22, further comprising:

means for obtaining access to the digital object if the selected authentication data is successfully authenticated by the validating peer node.

24. The requesting peer node of claim 21, wherein the information received from the validating peer node includes a second data structure, the second data structure cryptographically concealing an access identity of the digital object and further comprising: means for comparing the first data structure and the second data structure, wherein the requesting peer node is configured to access the digital object if there is a match of at least one identity of the requesting peer node and the validating peer node.

25. A non-transitory processor-readable medium comprising instructions operational on a requesting peer node, which when executed by a processor cause the processor to:

generate a first data structure that cryptographically conceals one or more identities of the requesting peer node or a user of the requesting peer node within a shared data space of the first data structure, wherein a representation of each of the one or more identities is uniformly and randomly distributed along the shared data space; and send the first data structure to a validating peer node as part of a request to access a digital object stored by the validating peer node, wherein the digital object is accessible to the requesting peer node if the one or more identities of the requesting peer node or the user of the requesting peer node match corresponding one or more identities of the validating peer node by sending authentication data corresponding to the matching access identity to the validating peer node.

26. The processor-readable medium of claim 25, comprising further instructions which when executed by a processor cause the processor to:

receive information from the validating peer node indicating whether any of the one or more identities of the requesting peer node is a match to a corresponding identity of the validating peer node, wherein the information received from the validating peer node includes a second data structure, the second data structure cryptographically concealing an access identity of the digital object;

compare the first data structure and the second data structure to ascertain whether there is an intersection of identities indicating a potential match; and access the digital object based on the intersection of identities.

27. A method operational in a validating peer node, comprising:

receiving a first data structure from a requesting peer node as part of a request to access a digital object, where the first data structure cryptographically conceals one or more identities of the requesting peer node or a user of the requesting peer node within a shared data space of the first data structure, wherein a representation of each of the one or more identities is uniformly and randomly distributed along the shared data space;

obtaining one or more access identities that are allowed to access the digital object;

generating a second data structure for each of the access identities, where the second data structure cryptographically conceals an access identity of the digital object;

performing a comparison between the first data structure and the second data structure to ascertain whether there is an intersection of identities indicating a potential match; and sending information to the requesting peer node indicating whether one or more identities of the requesting peer node or the user of the requesting peer node is a match to one or more access identities that are allowed to access the digital object, wherein the requesting peer node is configured to provide authenticating data if any of the one or more identities of the requesting peer node or the user of the requesting peer node is a match to the one or more access identities that are allowed to access the digital object, where the authenticating data corresponds to a matching access identity.

28. The method of claim 27, wherein the information sent to the requesting peer node indicating whether any of the one or more identities of the requesting peer node or the user of the requesting peer node is a match to the one or more access identities that are allowed to access the requested digital object comprises a matching identity or a concealed version of a matching identity.

29. The method of claim 28, further comprising: receiving authentication data associated with a matching identity identified by the validating peer device; and granting the requesting peer node access to the requested digital object if the received authentication data is successfully authenticated.

30. The method of claim 29, further comprising: authenticating the authentication data to verify that the requesting peer node is a member of a group identified by the matching identity.

31. The method of claim 28, wherein the information sent to the requesting peer node indicating whether any of the one or more identities of the requesting peer node or the user of the requesting peer node is a match to the one or more access identities that are allowed to access the requested digital object comprises a matching identity.

32. The method of claim 28, wherein the information sent to the requesting peer node indicating whether any of the one or more identities of the requesting peer node is a match to the one or more access identities that are allowed to access the requested digital object comprises a concealed version of the matching identity.

33. The method of claim 27, wherein the first data structure is a binary vector in which each of the one or more identities of the requesting peer node or the user of the requesting peer node are represented by a plurality of bits that are uniformly and randomly distributed along the binary vector.

34. The method of claim 33, wherein at least one of the first data structure and the second data structure is a Bloom filter vector in which each identity is represented by a plurality of bits uniformly and randomly distributed along the binary vector.

35. The method of claim 27, wherein the second data structure is a binary vector is generated by: applying a cryptographic hash function to a first identity to generate a binary string; partitioning the binary string into binary segments; converting each binary segment into a position index within the binary vector; and setting a vector value at an indicated position index of the binary vector to a non-default value.

36. The method of claim 27, wherein the requested digital object is stored by the validating peer node.

37. The method of claim 27, wherein the requested digital object is stored by a storing peer node.

38. A validating peer node, comprising: a communication interface for communicating with other peer nodes over an overlay network; a processing circuit coupled to the communication interface, the processing circuit adapted to:
receive a first data structure from a requesting peer node as part of a request to access a digital object, where the first data structure cryptographically conceals one or more identities of the requesting peer node or a user of the requesting peer node within a shared data space of the first data structure, wherein a representation of each of the one or more identities is uniformly and randomly distributed along the shared data space;
obtain one or more access identities that are allowed to access the digital object;
generate a second data structure for each of the access identities, where the second data structure cryptographically conceals an access identity of the digital object;
perform a comparison between the first data structure and the second data structure to ascertain whether there is an intersection of identities indicating a potential match; and
send information to the requesting peer node indicating whether one or more identities of the requesting peer node or the user of the requesting peer node is a match to one or more access identities that are allowed to access the digital object,
wherein the requesting peer node is configured to provide authenticating data if any of the one or more identities of the requesting peer node or the user of the requesting peer node is a match to the one or more access identities that are allowed to access the digital object, where the authenticating data corresponds to a matching access identity.

39. The validating peer node of claim 38, wherein the information sent to the requesting peer node indicating whether any of the one or more identities of the requesting peer node or the user of the requesting peer node is a match to the one or more access identities that are allowed to access the requested digital object comprises a concealed version of a matching identity.

40. The validating peer node of claim 39, wherein the processing circuit is further adapted to: receive authentication data associated with a matching identity identified by the validating peer device; and grant the requesting peer node access to the requested digital object if the received authentication data is successfully authenticated.

41. The validating peer node of claim 40, wherein the processing circuit is further adapted to: authenticate the authentication data to verify that the requesting peer node is a member of a group identified by the matching identity.

42. A validating peer node, comprising:
means for receiving a first data structure from a requesting peer node as part of a request to access a digital object, where the first data structure cryptographically conceals one or more identities of the requesting peer node or a user of the requesting peer node within a shared data space of the first data structure, wherein a representation of each of the one or more identities is uniformly and randomly distributed along the shared data space;
means for obtaining one or more access identities that are allowed to access the digital object;
means for generating a second data structure for each of the access identities, where the second data structure cryptographically conceals an access identity of the digital object;
means for performing a comparison between the first data structure and the second data structure to ascertain whether there is an intersection of identities indicating a potential match; and
means for sending information to the requesting peer node indicating whether one or more identities of the requesting peer node or the user of the requesting peer node is a match to one or more access identities that are allowed to access the digital object,
wherein the requesting peer node is configured to provide authenticating data if any of the one or more identities of the requesting peer node or the user of the requesting peer node is a match to the one or more access identities that are allowed to access the digital object, where the authenticating data corresponds to a matching access identity.

43. The validating peer node of claim 42, wherein the information sent to the requesting peer node indicating whether any of the one or more identities of the requesting peer node or the user of the requesting peer node is a match to the one or more access identities that are allowed to access the requested digital object comprises a concealed version of a matching identity.

44. The validating peer node of claim 43, further comprising: means for receiving authentication data associated with a matching identity identified by the validating peer device; and means for granting the requesting peer node access to the requested digital object if the received authentication data is successfully authenticated.

45. A non-transitory processor-readable medium comprising instructions operational on a validating peer node, which when executed by a processor causes the processor to:
receive a first data structure from a requesting peer node as part of a request to access a digital object, where the first data structure cryptographically conceals one or more identities of the requesting peer node or a user of the requesting peer node within a shared data space of the first data structure, wherein a representation of each of the one or more identities is uniformly and randomly distributed along the shared data space;
obtain one or more access identities that are allowed to access the digital object;
generate a second data structure for each of the access identities, where the second data structure cryptographically conceals an access identity of the digital object;
perform a comparison between the first data structure and the second data structure to ascertain whether there is an intersection of identities indicating a potential match; and send information to the requesting peer node indicating whether one or more identities of the requesting peer node or the user of the requesting peer node is a match to one or more access identities that are allowed to access the digital object, wherein the requesting peer node is configured to provide authenticating data if any of the one or more identities of the requesting peer node or the user of the requesting peer node is a match to the one or more access identities that are allowed to access the digital object, where the authenticating data corresponds to a matching access identity.

46. The processor-readable medium of claim 45 wherein the information sent to the requesting peer node indicating whether any of the one or more identities of the requesting peer node or the user of the requesting peer node is a match to the one or more access identities that are allowed to access the digital object comprises a concealed version of a matching identity.

47. The processor-readable medium of claim 46 comprising further instructions which when executed by a processor causes the processor to: receive authentication data associated with a matching identity identified by the validating peer device; and grant the requesting peer node access to the digital object if the received authentication data is successfully authenticated.

* * * * *